Nov. 25, 1924.    1,516,948
P. H. BENEDIX
FLUID PRESSURE ENGINE
Filed Jan. 17, 1922    3 Sheets-Sheet 1

Inventor
Paul H. Benedix.
By
Lacey & Lacey, Attorneys

Nov. 25, 1924.

P. H. BENEDIX 1,516,948

FLUID PRESSURE ENGINE

Filed Jan. 17, 1922

Inventor
Paul H. Benedix.

By Lacey & Lacey, Attorneys

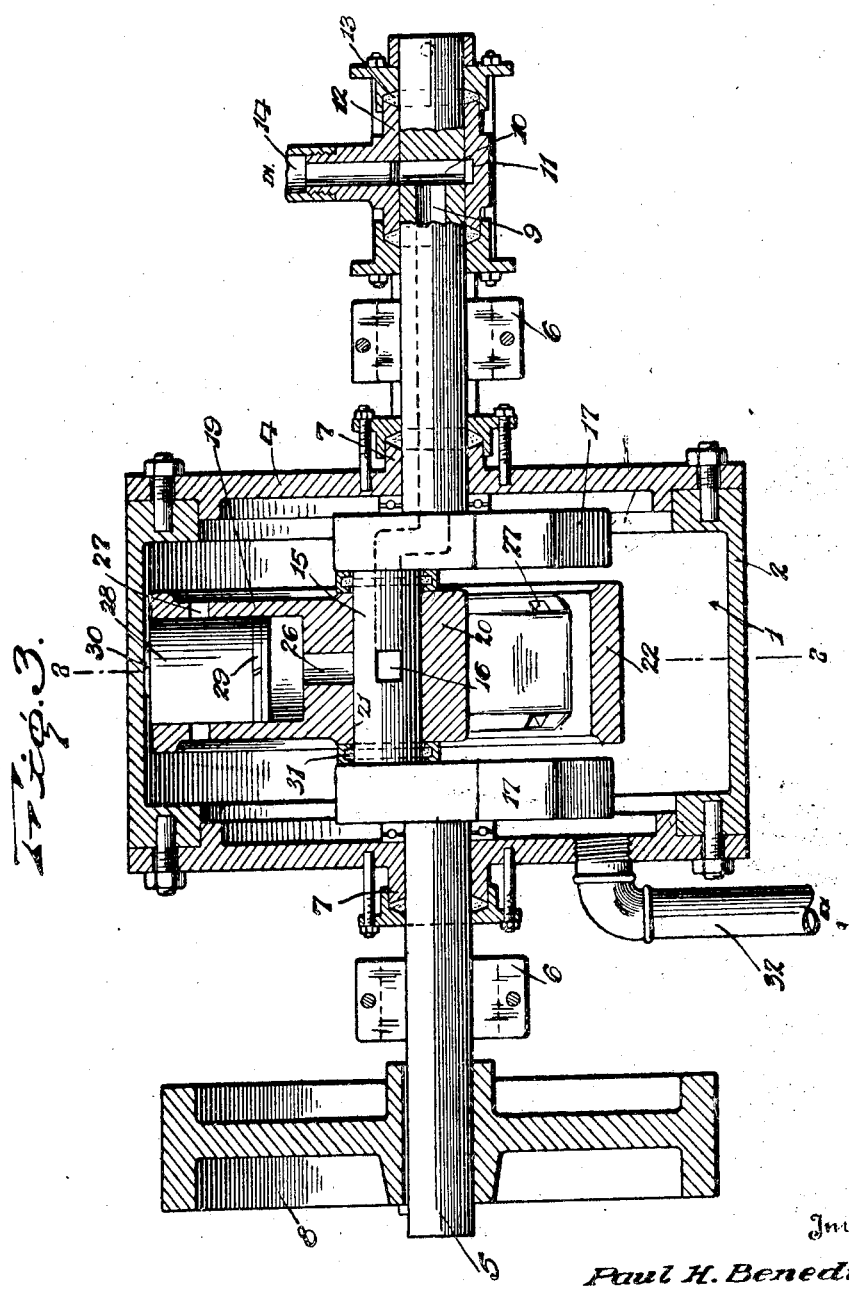

Patented Nov. 25, 1924.

1,516,948

UNITED STATES PATENT OFFICE.

PAUL H. BENEDIX, OF CHICAGO, ILLINOIS.

FLUID-PRESSURE ENGINE.

Application filed January 17, 1922. Serial No. 529,873.

*To all whom it may concern:*

Be it known that I, PAUL H. BENEDIX, a citizen of the United States, residing at Chicago, in the county of Cook and State of Illinois, have invented certain new and useful Improvements in Fluid-Pressure Engines, of which the following is a specification.

This invention relates to fluid pressure engines and has as its object, generally, to provide an engine which will be highly efficient in operation, simple in construction, and adapted to be operated economically.

Another object of the invention is to provide a fluid pressure engine devoid of complicated valves and operating means therefor.

Another object of the invention is to provide an engine operated by fluid pressure and so constructed as to be set in operation immediately upon admission of fluid under pressure thereto regardless of the positions in which its component parts may be standing at the time of such admission.

A further object of the invention is to so construct the engine that changes in speed may be effected practically instantaneously thus adapting the engine for use under conditions where engines or motors of the ordinary types could not be employed except in conjunction with clutches or gearing for effecting such changes.

In the accompanying drawings:

Figure 3 is a diametric sectional view on the line 3—3 of Figure 2 looking in the direction indicated by the arrows.

Figure 1:
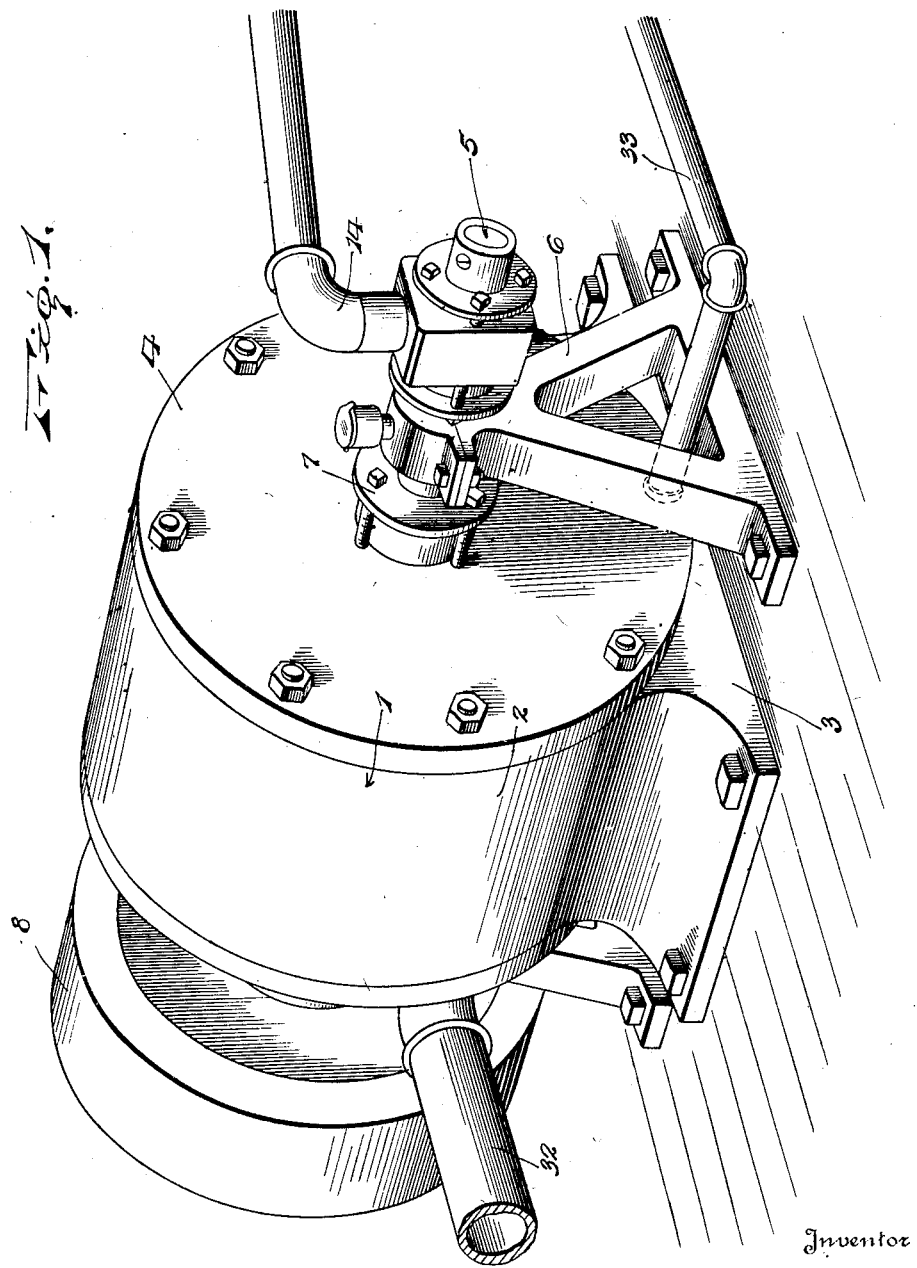
Figure 1 is a perspective view of the engine embodying the invention.

So far as I am aware the engine embodying the present invention is constructed and operates on a principle radically different from any other fluid pressure engine and, briefly stated, this principle involves the expansion, by fluid pressure, of a medium which acts between the power transmitting means of the engine and an abutment, and while the drawings illustrate a specific embodiment of this principle, it is to be understood that they are merely representative of the general idea involved and are not to be considered as restricting the invention to the precise structure disclosed. In fact the structure may be variously modified in accordance with the principles involved. A factor of primary importance is the elimination of connecting rods, wrist pin connections and bearings, and all similar mechanical devices for transmitting power from the part which is acted upon by the fluid under pressure to the power transmitting element of the engine so that the many disadvantages and complications attending the construction and upkeep of the ordinary types of fluid pressure engines are overcome.

In the illustrated embodiment of the invention the operating parts of the engine are enclosed and operate within a cylinder or casing but the primary function of the wall of this casing is that of an abutment, and therefore the fact that the part in question serves also, in the present instance, as a casing, is merely incidental as it is not required that the said operating parts be enclosed. Therefore this portion of the engine will be considered and referred to as an abutment, in the specific description which is to follow. This abutment is indicated in general by the numeral 1 and the same comprises a cylindrical body 2 which may be supported in any desired manner as for example by an integral base portion 3, removable heads 4 being applied to the opposite sides of the body to close the same. The engine shaft is indicated in general by the numeral 5 and the same is mounted in suitable pedestal bearings 6 located at the opposite sides of the abutment 1, the shaft extending through suitable stuffing boxes 7 upon the heads 4 as clearly shown in Figure 3 of the drawings. A fly wheel 8 is mounted upon one end of the shaft 5 and, for a purpose to be presently explained, the other end of the shaft is extended through and beyond the respective bearing 6. Fluid under pressure, whether it be steam or air, is to be supplied to the engine through the shaft 5, and with this end in view the shaft is provided axially in its last mentioned end portion with a fluid pressure duct or passage 9 communicating at one end with a diametric branch 10 formed in the said shaft and in turn communicating with an annular passageway or channel 11 formed in the wall of a chest 12 which is disposed to surround the said end of the shaft and is provided with suitable stuffing boxes or other packing means 13 to effect a fluid-tight joint. A fluid pressure supply pipe 14 which leads from any suitable source of supply, communicates with the interior of the chest 12 and because of the provision of the passageway or channel 11, is adapted to at all times supply fluid under pressure to the duct 9. Intermediate its ends the shaft is provided with a crank 15, and the duct or passage 9 leads into this portion of the shaft and terminates in an outlet port 16. At this point it is to be noted that the shaft 5 has its axis of rotation concentric to the abutment 1 and that the crank 15 operates within the circumference of said abutment, and it is between the abutment and the said crank 15 that means is expanded by the fluid under pressure to react against the said crank to rotate the shaft.

In order to counterbalance the crank 15 the shaft 5 is formed at the ends of its said crank portion with counterweights indicated by the numeral 17.

Figure 2:
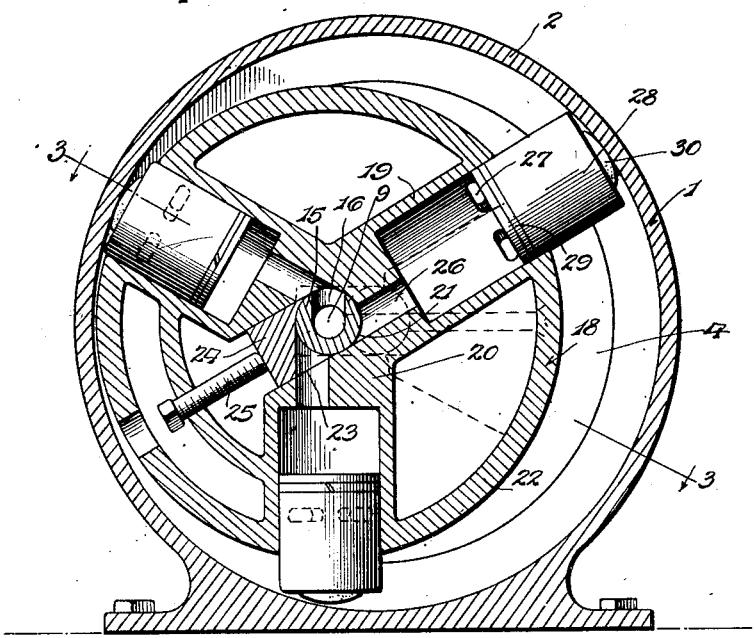
Figure 2 is a vertical sectional view through the engine on the line 2—2 of Fig. 3.
Figure 4:
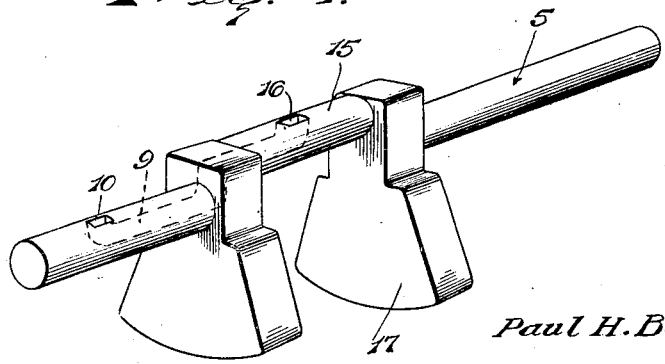
Figure 4 is a perspective view of the shaft of the engine.

The fluid pressure expansive means which acts between the abutment 1 and the crank of the shaft 5, is mounted upon the said crank and includes a cylinder assemblage which is indicated in general by the numeral 18 and which in the present instance comprises a set of three cylinders 19 radially disposed about a common axis. These cylinders are preferably integrally cast at their inner ends with a center block 20 provided with a bearing opening 21 receiving the crank portion 15 of the shaft 5, the said center block being freely rotatable upon the said crank of the shaft so that the cylinder assemblage may be considered as floating about the shaft and within the circumference of the abutment 1. In the present instance the outer ends of the cylinders 19 are connected by an annular rim 22 cast integral therewith but it is not absolutely essential that this be provided and in fact the cylinders, if braced at all, might be braced by any means suitable for the purpose. Also while three cylinders are illustrated in the present instance, it will be understood that any desired number may be employed. Also in the illustrated embodiment of the invention the center block 20 is formed with a recess 23 leading radially from the bearing opening 21, and a filler block 24 is removably fitted in this recess and embraces one side of the crank 15 and is held in place by a set screw 25, this structure providing for assemblage of the said center block 20 with the said crank. However the block 20 might be otherwise constructed so as to provide for assemblage of the parts. Each cylinder has associated with it an inlet port 26 which leads from its center and substantially radially inwardly to the opening 21, and therefore the inner ends of the ports are arranged to be successively placed in communication with the port 16 in the relative rotation of the parts. The cylinders 19 are formed or provided near their outer ends with exhaust ports 27 which open into the space enclosed by the abutment 1. A piston 28 is slidably mounted in each cylinder and may be provided with one or more packing rings 29, and each piston is provided at its outer end with a buffer 30 which may be of wood, leather, or any material found suitable for the purpose. These buffers are of convex form and ride against the inner surface of the abutment 1 as clearly shown in Figures 2 and 3 of the drawings. Referring now to Figure 2 of the drawings it will be evident that when the pistons 28 are at the extreme limit of their outward movement, the corresponding exhaust ports 27 will be uncovered but when the pistons are projected to a less extent these ports are covered.

Suitable packing glands 31 may be provided about the crank 15 of the shaft 5 at the opposite sides of the center block 20 of the cylinder assemblage so as to afford a fluid-tight connection between the parts and prevent the escape of the fluid under pressure at this point.

By reference to Figure 2 of the drawings it will be understood that with the parts initially in the positions shown in this figure, steam, or air under pressure is admitted through the duct 9 and port 16 and enters the upper left hand cylinder in said figure. The fluid under pressure acts against the piston in the cylinder forcing the same against the abutment 1, but as the piston cannot have further outward movement, the fluid pressure reacts against the cylinder assemblage and through the same against the crank of the shaft 5 thus effecting a rotation of the said crank and the shaft of which it forms a part. In the meantime the rotation of the shaft will bring the port 16 into communication with the port 26 of the lower central cylinder in the said Figure 2 and further impetus will be given the shaft because of the fluid pressure acting between the piston in the said cylinder and the cylinder assemblage. In the meantime the piston in the first mentioned cylinder has moved outwardly sufficiently far to uncover the exhaust ports of the respective cylinder, and the preceding operation is repeated successively as regards the several cylinders and pistons. As a result, the shaft 5 will be rapidly rotated, and its speed of rotation may be regulated by regulating the admission of fluid under pressure.

In the present instance, inasmuch as the body comprising the abutment 1 is closed by the heads 4, an exhaust pipe 32 is fitted through one of the said heads and leads to any convenient or suitable point. However it is not essential that the heads 4 be employed inasmuch as they might be replaced by spiders in which event the exhaust through the ports 27 would be directed to the atmosphere. Of course whether or not the heads are employed will depend largely upon the nature of the fluid pressure medium.

In the event steam is employed as the motive fluid, a drain pipe 33 may be led from the lower portion of one of the heads 4 so as to carry off the water of condensation.

It will be understood of course that the mechanism embodying the present invention may be employed as an air presser or as a fluid pump by applying power to the shaft thereof.

Having thus described the invention what is claimed as new is:—

1. In a fluid pressure engine, a shaft having a crank, a casing having a cylindrical wall surrounding the shaft and concentric to the axis thereof, an assemblage of cylinders within the casing upon the said crank of the shaft, means for admitting fluid under pressure to said cylinders successively in the rotation of the shaft, and pistons freely operating in the cylinders and against the said wall of the casing, the cylinders having exhaust ports to be uncovered by the pistons when the pistons are substantially at the limit of their outward movement.

2. In a fluid pressure engine, a casing having a cylindrical wall, a shaft rotatably mounted within the casing with its axis concentric to said wall, the shaft being provided with a crank portion, an assemblage of cylinders freely rotatably mounted upon the crank portion of the shaft, the cylinders of the assemblage being substantially radial to the crank portion and having their outer ends presented toward the cylindrical wall of the casing, pistons freely slidably mounted in the cylinders, the cylinders having exhaust ports near their said outer ends, the outer ends of the pistons riding against the inner surface of the said cylindrical wall of the casing, and means for successively admitting fluid under pressure into the cylinders behind the inner ends of the pistons.

3. In a fluid pressure engine, a casing having a cylindrical wall, a shaft rotatably mounted within the casing with its axis concentric to said wall, the shaft being provided with a crank portion, an assemblage of cylinders freely rotatably mounted upon the crank portion of the shaft, the cylinders of the assemblage being substantially radial to the crank portion and having their outer ends presented toward the cylindrical wall of the casing, pistons freely slidably mounted in the cylinders, the cylinders having exhaust ports near their said outer ends, the outer ends of the pistons riding against the inner surface of the said cylindrical wall of the casing, means for successively admitting fluid under pressure into the cylinders behind the inner ends of the pistons, and a counter-balancing means upon the shaft arranged in opposition to the crank portion thereof whereby to counter-balance the said assemblage of cylinders.

4. In a fluid pressure engine, a casing having a cylindrical wall, a shaft rotatably mounted within the casing with its axis concentric to the said wall, the shaft being provided with a crank portion and with counter-weights at the opposite ends of the crank portion and offset diametrically with relation thereto, a rotor mounted for free rotation upon the crank portion of the said shaft and embodying a plurality of radial cylinders, the cylinders being open at their outer ends and having their said ends presented toward the cylindrical wall of the casing, pistons freely slidably mounted in the cylinders, the cylinders having exhaust ports near their outer ends to be uncovered by the pistons on their outward stroke, the outer ends of the pistons riding against the inner surface of the said cylindrical wall of the casing, and means for successively admitting fluid under pressure into the cylinders behind the inner ends of the pistons.

In testimony whereof I affix my signature.

PAUL H. BENEDIX. [L. S.]